Oct. 1, 1935.  W. E. DE LHORBE  2,015,924
GREENHOUSE BENCH
Filed Aug. 2, 1933
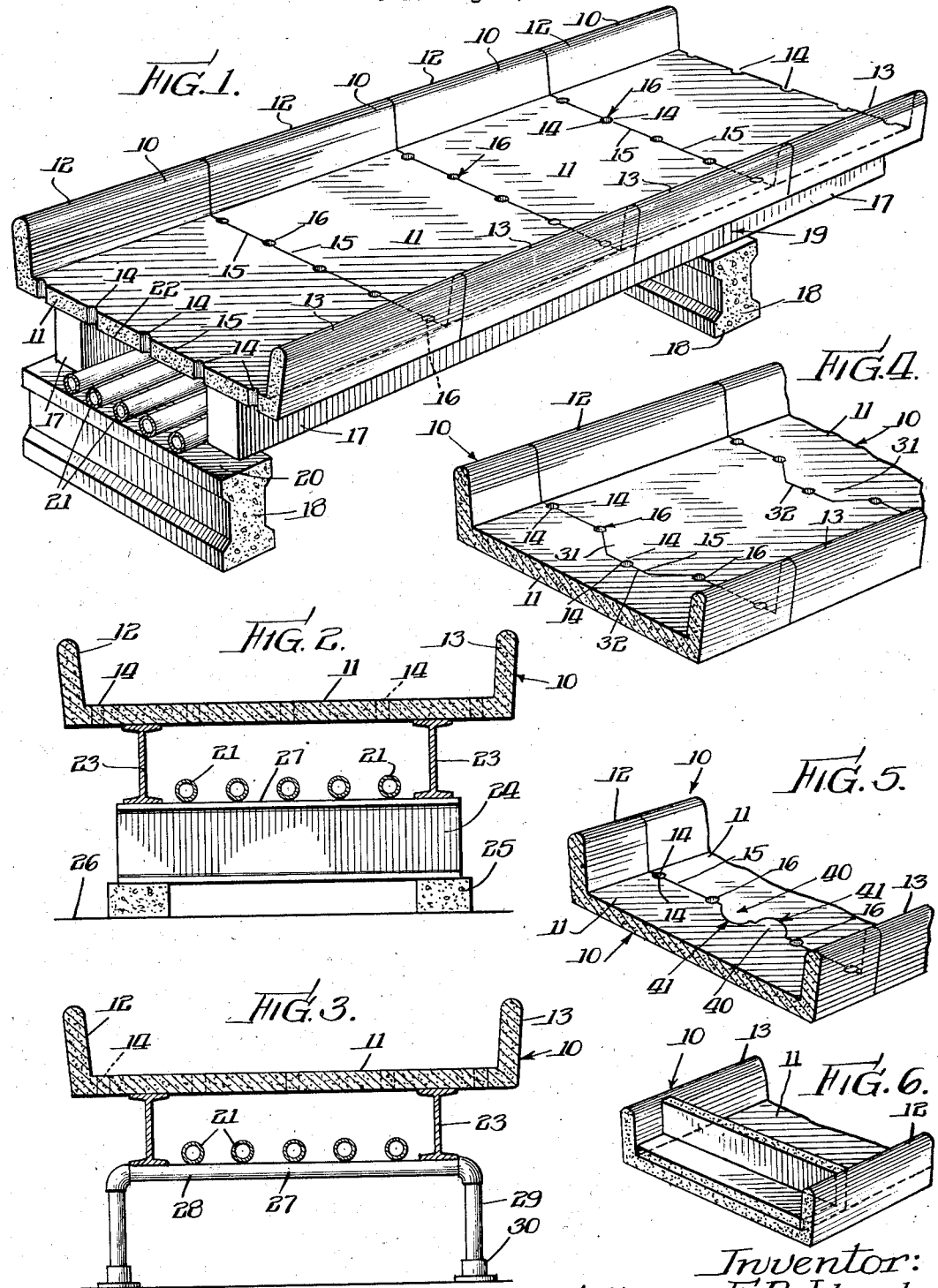
Inventor:
William E. DeLhorbe
By Cox & Moore
attys.

Patented Oct. 1, 1935

2,015,924

UNITED STATES PATENT OFFICE 2,015,924

GREENHOUSE BENCH

William E. De Lhorbe, Oregon, Ill.

Application August 2, 1933, Serial No. 683,329

2 Claims. (Cl. 47—18)

This invention relates to greenhouse benches, and the primary object of the invention is to provide composite greenhouse benches made in sections, the sections being made from composite material, such as concrete, and provided with weep holes to permit the proper drainage.

Another object of the invention is to provide a greenhouse bench whereby the plants are grown directly on the bench which is provided with sloping side walls formed integral with the base.

A further object is to provide a greenhouse bench made in a plurality of sections having complementary means whereby each section is interlocked with an adjacent section.

A still further object of the invention is the provision of greenhouse benches which are strong and durable in construction; which will not deteriorate readily; which are provided with proper drainage facilities; which are capable of being added onto by the addition of additional sections; which have a supporting base adapted to carry the heating pipes, and which are provided with proper draining means.

Numerous other objects and advantages will be apparent throughout the progress of the following specification.

The accompanying drawing illustrates a selected embodiment of the invention and the views therein are as follows:

Fig. 1 is a detail perspective view of an improved greenhouse bench and embodying the invention.

Fig. 2 is a detail transverse section showing a greenhouse bench carried by a modified form of supporting structure.

Fig. 3 is a view similar to Fig. 2 showing still another modification.

Fig. 4 is a detail perspective view showing interlocking sections.

Fig. 5 is a detail perspective view showing the sections provided with complementary flanges and recesses.

Fig. 6 is a detail perspective view showing the end members arranged in position.

The particular greenhouse construction herein shown for the purpose of illustration comprises a plurality of sections 10 each of which is provided with a base 11 and oppositely disposed side walls 12 and 13. The sections 10 are made from composite material, such as concrete, and the base 11 and the side walls 12 and 13 are preferably formed integral. The side walls 12 and 13 may be inclined outwardly as clearly shown in the various figures. A plurality of semi-cylindrical alined weep holes 14 are provided at the sides or edges 15 of each section so that when a pair of sections are arranged adjacent to each other and in juxtaposition, cylindrical weep holes 16 are formed.

The sections 10 are arranged in adjacent position and are supported by longitudinal supports or beams 17 which rest upon and are supported by pedestals or piers 18. The supports or beams 17 are spaced apart as indicated at 19, Fig. 1, to provide an expansion joint between the sections of the column to permit for longitudinal expansion and contraction of the device. The supports 17 and the pedestals or piers 18 may also be made of composite material, such as concrete.

The tops 20 of the pedestals or piers 18 are adapted to support a plurality of heating pipes 21 which are arranged below the bottom 22 of the sections when they are arranged to form a bench structure.

End members, such as shown in Fig. 6 may be clamped or otherwise fixed in position to the ends of the end sections, if desired.

In Fig. 2 the sections 10 are shown supported on longitudinal I-beams 23 which in turn are supported on transverse I-beams 24, suitable pedestals 25 being provided to raise the bottoms of the transverse I-beams 24 a sufficient distance above the floor 26. The steam pipes 21 are adapted to be supported by the upper surface 27 of the transverse I-beams.

The embodiment shown in Fig. 3 shows the longitudinal I-beams 23 supported on supporting means 27. The supporting means 27 includes transverse pipes 28 which support the heating pipes 21 and the vertical pipes and collars 29 and 30 respectively.

To prevent accidental displacement of one section relative to another section, a tongue 31 may be formed on one end of the section and a recess 32 formed on the other end of the section. The tongue of one section will engage the recess 32 of an adjacent section as clearly shown in Fig. 4. Other means for preventing accidental transverse displacement of one section relative to another section is shown in Fig. 5. In this latter view the ends of each section are provided with an S-shaped formation providing a tongue 40 and a recess 41, the tongue 40 being receivable in the groove or recess 41 of the adjacent section, while the tongue 40 will be received in the recess 41 of the adjacent section. The tongue and recess construction of one section has complementary engagement with the recess and tongue of the adjacent section and being constructed as shown, permits the tongue and recess of a section, regardless of which side of the complementary section, to be complementarily received by the similar construction of the adjacent section.

The invention provides a bench made of composite material having the proper drainage facilities so that plants may be propagated and grown directly thereon thereby eliminating the usual wooden construction which is expensive and which rapidly deteriorates. The present invention also permits benches to be made of various sizes as sections may be removed or added as the necessity arises. The greenhouse bench construction herein disclosed can be readily and quickly installed and can be very economically manufactured.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. A greenhouse bench construction comprising a plurality of sections made of composite material and arranged in adjacent position, said sections extending across the entire width of the bench and having integral outwardly inclined ends which comprise the sides of the bench when the sections are arranged in adjacent longitudinal position, said sections each being provided with weep holes on their side edges which aline with the weep holes of adjacent sections to provide for drainage for the bench, and removable transverse end members for the ends of the bench arranged between the inclined sides.

2. A greenhouse bench construction comprising a plurality of sections made of composite material and arranged in adjacent position, said sections extending across the entire width of the bench and having integral slanting ends which comprise the sides of the bench when the sections are arranged in adjacent longitudinal position, and complementary interlocking means formed on the sides of each of said sections and engaging each other to prevent accidental displacement of one section relative to an adjacent section and to positively position said sections, said sections each being provided with weep holes on their side edges which aline with the weep holes in adjacent sections to provide for drainage for the bench, and transverse end members for the ends of the bench.

WILLIAM E. DE LHORBE.